(12) United States Patent
Nagaya et al.

(10) Patent No.: US 8,556,549 B2
(45) Date of Patent: Oct. 15, 2013

(54) CUTTING TOOL WITH DETACHABLE INSERT, HEAD MEMBER AND TOOL BODY OF THE SAME

(75) Inventors: Hidehiko Nagaya, Hoffman Estates, IL (US); Norio Aso, Sashima-gun (JP); Yasuharu Imai, Shimotsuma (JP)

(73) Assignee: Mitsubishi Materials Corporation, Tokyo (JP)

( * ) Notice: Subject to any disclaimer, the term of this patent is extended or adjusted under 35 U.S.C. 154(b) by 439 days.

(21) Appl. No.: 12/734,352

(22) PCT Filed: Oct. 28, 2008

(86) PCT No.: PCT/JP2008/069561
§ 371 (c)(1),
(2), (4) Date: Jun. 28, 2010

(87) PCT Pub. No.: WO2009/057599
PCT Pub. Date: May 7, 2009

(65) Prior Publication Data
US 2010/0266352 A1    Oct. 21, 2010

(30) Foreign Application Priority Data

Oct. 30, 2007  (JP) ................. 2007-282118

(51) Int. Cl.
*B23B 27/04* (2006.01)

(52) U.S. Cl.
USPC ............................ 407/109; 407/107; 407/101

(58) Field of Classification Search
USPC ................. 407/101, 109, 107, 110
See application file for complete search history.

(56) References Cited

U.S. PATENT DOCUMENTS 3,372,451 A    3/1968  Pinder et al.
3,376,763 A    4/1968  Welles (Continued)

FOREIGN PATENT DOCUMENTS

CH    692449 A5    6/2002
DE    4028361      3/1991

(Continued)

OTHER PUBLICATIONS

Notice of Allowance mailed on Sep. 18, 2012, issued for Japanese Patent Application No. 2007-282119 and English translation thereof.

(Continued)

*Primary Examiner* — Will Fridie, Jr.
(74) *Attorney, Agent, or Firm* — Edwards Wildman Palmer LLP

(57) ABSTRACT

In a head member (30) for this cutting tool with detachable insert (70), a slit (38) is provided so as to further extend towards a rear end side from a rear end for an insert attachment seat formed by a pressing surface of an upper jaw portion of a head member body (31) and a pedestal surface of a lower jaw portion (33). Also, a clamp screw engaged with the upper jaw portion is screwed while inclining in a direction separated as it moves towards the lower jaw portion (33), with respect to an imaginary plane (P) which extends along an extension direction of the slit (38) and in a direction in which the pressing surface and the pedestal surface face each other, whereby the upper jaw portion is enabled to elastically deform by using as a fulcrum a connecting portion 39 between a rear wall surface (38B) of the slit (38), and a rear end surface (31F) of the head member body (31). Moreover, the connecting portion (39) is formed such that the width thereof in the extension direction becomes gradually greater as the clamp screw moves in a separating direction from the imaginary plane (P). According to the head member (30), a cutting insert (50) can be stably clamped by elastically deforming the jaw portion formed with the pressing surface straight with respect to the pedestal surface while operating a large clamping force.

4 Claims, 8 Drawing Sheets

(56) References Cited

U.S. PATENT DOCUMENTS

| | | | |
|---|---|---|---|
| 4,992,007 A | 2/1991 | Satran | |
| 5,112,164 A | 5/1992 | Pano | |
| 5,288,180 A * | 2/1994 | Hedlund | 407/101 |
| 5,709,508 A * | 1/1998 | Barazani et al. | 407/101 |
| 5,833,403 A * | 11/1998 | Barazani | 407/101 |
| 5,873,682 A | 2/1999 | Tripsa | |
| 6,186,704 B1 * | 2/2001 | Hale | 407/101 |
| 6,270,293 B2 | 8/2001 | Erickson et al. | |
| 7,246,974 B2 * | 7/2007 | Hansson et al. | 407/109 |
| 7,758,286 B2 * | 7/2010 | Nagaya et al. | 407/101 |
| 7,780,380 B2 * | 8/2010 | Nagaya et al. | 407/101 |
| 8,277,150 B2 | 10/2012 | Watanabe et al. | |
| 2004/0247404 A1 * | 12/2004 | Oettle | 407/117 |
| 2005/0129471 A1 | 6/2005 | Englund | |
| 2007/0207671 A1 | 9/2007 | Nagaya et al. | |

FOREIGN PATENT DOCUMENTS

| | | |
|---|---|---|
| DE | 102005038828 | 2/2007 |
| EP | 0526438 A2 | 2/1993 |
| EP | 1829636 | 9/2007 |
| JP | 01-115504 A | 5/1989 |
| JP | 5-56305 U | 7/1993 |
| JP | 05-192802 A | 8/1993 |
| JP | 08-215904 A | 8/1996 |
| JP | 2001-062610 A | 3/2001 |
| JP | 2004-202631 A | 7/2004 |
| JP | 2005-118992 A | 5/2005 |
| JP | 2007-260892 A | 10/2007 |
| JP | 2009-107071 A | 5/2009 |
| WO | WO-00/51768 | 9/2000 |
| WO | WO-2007/019892 A1 | 2/2007 |

OTHER PUBLICATIONS

Office Action mailed on Jun. 12, 2012, issued for Japanese Patent Application No. 2007-282119 and English translation thereof.
Supplementary European Search Report dated Feb. 27, 2012, issued for the corresponding European Patent Application No. 08843766.0.
International Search Report dated Dec. 2, 2008, issued in PCT/JP2008/069544 with English translation thereof.
International Search Report dated Dec. 2, 2008, issued on PCT/JP2008/069561.
Supplementary European Search Report dated Mar. 30, 2011, issued for the corresponding European patent application No. 08845496.2.
Notice of Allowance mailed on Dec. 28, 2012 for U.S. Appl. No. 12/734,353.

* cited by examiner

CUTTING TOOL WITH DETACHABLE INSERT, HEAD MEMBER AND TOOL BODY OF THE SAME

CROSS REFERENCE TO RELATED APPLICATIONS

This application is related to co-pending application: "CUTTING TOOL WITH DETACHABLE INSERT, HEAD MEMBER AND TOOL BODY OF THE SAME" filed even date herewith in the names of Hidehiko Nagaya, Norio Aso and Yasuharu IMAI as a national phase entry of PCT/JP2008/069544, which application is assigned to the assignee of the present application and is incorporated by reference herein.

TECHNICAL FIELD

The present invention relates to a head member of a cutting tool with detachable insert which is formed with an insert attachment seat to which a cutting insert having cutting blades is detachably attached and which constitutes the insert detachable cutting tool by being mounted on a tip portion of a holder, a tool body on which the head member is mounted on the tip portion of the holder, and a cutting tool with detachable insert which is used for, for example, grooving or cutting-off of a work material and in which an insert is clamped by the head member attached to the tip portion of the holder.

Priority is claimed on Japanese Patent Application No. 2007-282118, filed Oct. 30, 2007, the content of which is incorporated herein by reference.

BACKGROUND ART

As a cutting tool with detachable insert used for grooving or cutting-off of a work material, there is a tool having the following structure. In this tool, a pressing surface is provided in one jaw portion of a pair of jaw portions formed at the tip of a holder. And a pedestal surface is provided in the other jaw portion of the pair of jaw portions. The pressing surfaces and a pedestal surface are arranged so as to face each other. An insert attachment seat is formed in this way. Additionally, from a rear end of the insert attachment seat, a slit is provided so as to further extend towards the rear end of the tool. A cutting insert which has cutting blades is clamped and attached between the pressing surface and the pedestal surface by screwing in the clamp screw engaged with one jaw portion, and elastically deforming one jaw portion. In Patent Document 1, a cutting tool with detachable insert in which this insert attachment seat is formed in a head member detachably mounted on the tip portion of the holder is suggested.
[Patent Document 1] Japanese Patent Unexamined Publication No. 05-192802

DISCLOSURE OF INVENTION

Technical Problem

In the cutting tool with detachable insert including such a head member, it is desirable that the clamp screw be made to engage one jaw portion at a position as close to the insert attachment seat as possible in the extension direction of the slit or a direction towards the rear end side from the tip side. In this way, it is desirable that the clamping force is made to act directly on the clamp of the cutting insert as much as possible.

However, the width of the pair of jaw portions is limited, especially in the cutting tool with detachable insert used for grooving or cutting-off. Thus, in inserting the clamp screw through one jaw portion and screwing the clamp screw into the other jaw portion as shown in Patent Document 1, the diameter of the clamp screw should be made small, and there is a possibility that a sufficient clamping force cannot be obtained. Additionally, it is difficult to secure the space for screwing a large-diameter clamp screw into the head member detachably mounted to the holder.

Thus, it is possible to consider that a clamp screw engaged with the one jaw portion in this way should be screwed into the holder while inclining in a separate direction as it moves towards the other jaw portion, with respect to an imaginary plane which extends in a direction in which the pressing surface and the pedestal surface face each other along an extension direction of the slit. In a case where such a construction is adopted, the large-diameter clamp screw can be engaged with one jaw portion near the insert attachment seat, irrespective of the width of the jaw portions, or the size of the head member.

However, on the other hand, when the clamp screw is inclined and screwed in this way, one jaw portion elastically deforms in a direction in which the pressing surface and the pedestal surface approach each other, and simultaneously, also elastically deforms so as to be bent in the screwing direction of the clamp screw and incline with respect to the imaginary plane. Therefore, there is possibility that the pressed position of the cutting insert by the pressing surface is biased, and the clamping of the cutting insert becomes unstable. For this reason, even if a large clamping force is obtained, there is a possibility that the cutting insert is inclined and clamped or clattering occurs in the insert during cutting, and thus machining accuracy is degraded.

The present invention was made taking the above into consideration, and the object of the present invention is to provide a head member for a cutting tool with detachable insert capable of clamping a cutting insert stably by elastically deforming one jaw portion formed with a pressing surface straight with respect to a pedestal surface, while a large clamping force is made to act on a cutting insert especially in the head member of an insert detachable cutting tool used for grooving or cutting-off, a tool body in which the head member is mounted on a tip portion of a holder, and a cutting tool with detachable insert in which an insert is clamped by the head member attached to the tip portion of the holder.

Technical Solution

The present invention relates to a head member for a cutting tool with detachable insert including a head member body formed with an insert attachment seat to which a cutting insert having cutting blades is detachably attached, and constituting the cutting tool by being mounted to a tip portion of a holder. The insert attachment seat is formed by a pressing surface of one jaw portion and a pedestal surface of the other jaw portion in a pair of jaw portions formed in the head member body so as to be opened towards the tip side and extend towards a rear end side of the head member body. Additionally, from a rear end of the insert attachment seat, a slit is provided so as to further extend towards the rear end side. Also, a clamp screw engaged with the one jaw portion is screwed into the holder while inclining in a direction separated as it moves towards the other jaw portion, with respect to an imaginary plane which extends along an extension direction of the slit and in a direction in which the pressing surface and the pedestal surface face each other, whereby the one jaw portion is enabled to elastically deform towards the other jaw portion by using as a fulcrum a connecting portion of the pair of jaw portions formed between the rear wall surface of the slit which faces the tip side, and the rear end surface of the head member body located on the extension direction of the rear wall surface. Moreover, the connecting portion is formed such that the width thereof in the extension direction becomes gradually greater as the clamp screw moves in the direction separated from the imaginary plane. Additionally, the present invention relates also to a tool body to which such a head member is mounted on the tip portion of the holder, and an cutting tool with detachable insert used in which an insert is clamped by the head member attached to the tip portion of the holder.

In the cutting tool with detachable insert to which the head member constructed in this way is applied, a clamp screw engaged with the one jaw portion is screwed into the holder while inclining in a direction separated as it moves towards the other jaw portion, with respect to an imaginary plane which extends in a direction in which the pressing surface and the pedestal surface face each other along an extension direction of the slit. Therefore, by using a large-diameter clamp screw, and engaging the clamp screw with one jaw portion at a position closer to the insert attachment seat irrespective of the width of the jaw portions, the size of the head member body, etc., one jaw portion can be made to elastically deform, and a large clamping force can be made to act on a cutting insert.

On the other hand, the connecting portion between the rear wall surface of the slit and the rear end surface of the head member body, which becomes a fulcrum of this elastic deformation, is formed so that the clamp screw screwed in while inclining to the imaginary plane becomes gradually wider in the direction separated from the imaginary plane towards the screwing direction. That is, since the connecting portion becomes thick-walled on the side of the separating direction, one jaw portion hardly deforms on the side of the separating direction. For this reason, it is possible to restrain one jaw portion to be elastically deformed as it inclined accompany the clamp screw to be screwed in as it inclined. As a result, it is possible to make the pressing surface of the one jaw portion approach the pedestal surface straight along the imaginary plane, and clamp a cutting insert reliably and stably by the above-described large clamping force.

In addition, although depend on the size of the connecting portion and the clamping force, if the width of the connecting portion in the extension direction which becomes thick on the side of the separating direction becomes too large, elastically deforming one jaw portion towards the other jaw portion itself may become difficult. On the other hand, if the difference between the width of the connecting portion in the separating direction and the width of the connecting portion opposite thereto is too small, the above-described effects may not be sufficiently exhibited. Accordingly, it is desirable that the connecting portion become gradually wider so that the rear wall surface and the rear end surface intersect each other within a range of 5° to 15° in a cross-section along the extension direction of the slit in the rear wall surface.

Additionally, such a head member is mounted on the holder, for example, by screwing the fixing screw inserted through the head member body into the tip portion of the holder. However, when the head member body mounted on the tip portion of the holder with a limited size is formed with an insertion hole through which the fixing screw is inserted, since the insertion hole and the slit will interfere with each other, the length of the slit may be limited. Thus, in such a case, a rear end portion of the slit may be formed with a bent portion which is provided so as to extend towards the rear end side while being bent towards the one jaw portion, thereby extend and provide the slit so as to avoid the interference with the insertion hole. Thereby, since the connecting portion which becomes a fulcrum of elastic deformation can be located closer to the rear end side, even if one jaw portion along the imaginary plane has elastically deformed, the cutting insert can be reliably pressed by making the inclination of the pressing surface as small as possible, and higher clamp stability can be secured.

Advantageous Effects

As described above, according to the present invention, a large clamping force can be made to act on the cutting insert by using a larger-diameter clamp screw, irrespective of the width of the jaw portions or the size of the head member body. Additionally, although the clamp screw is screwed into the holder as it inclined, the one jaw portion formed with the pressing surface can be elastically deformed straight with respect to the pedestal surface without inclining. As a result, it is possible to clamp the cutting insert stably and firmly and to improve machining accuracy.

EXPLANATION OF REFERENCE

Figure 1:
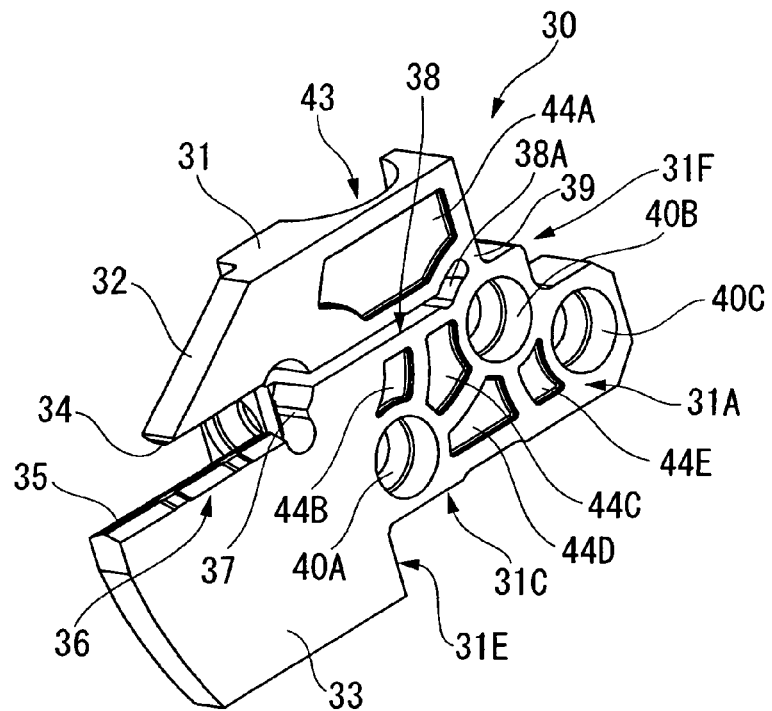
FIG. 1 is a perspective view when a head member of one embodiment of the present invention is seen from the upside of the tip and one side surface of a head member body.
Figure 2:
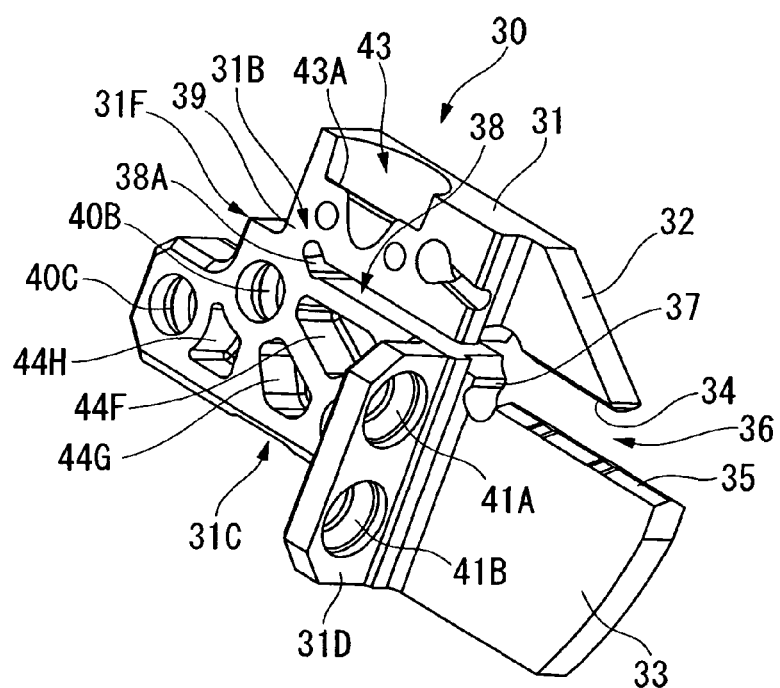
FIG. 2 is a perspective view when the embodiment shown in FIG. 1 is seen from the upside of the tip and the other side surface of the head member body.
Figure 3:
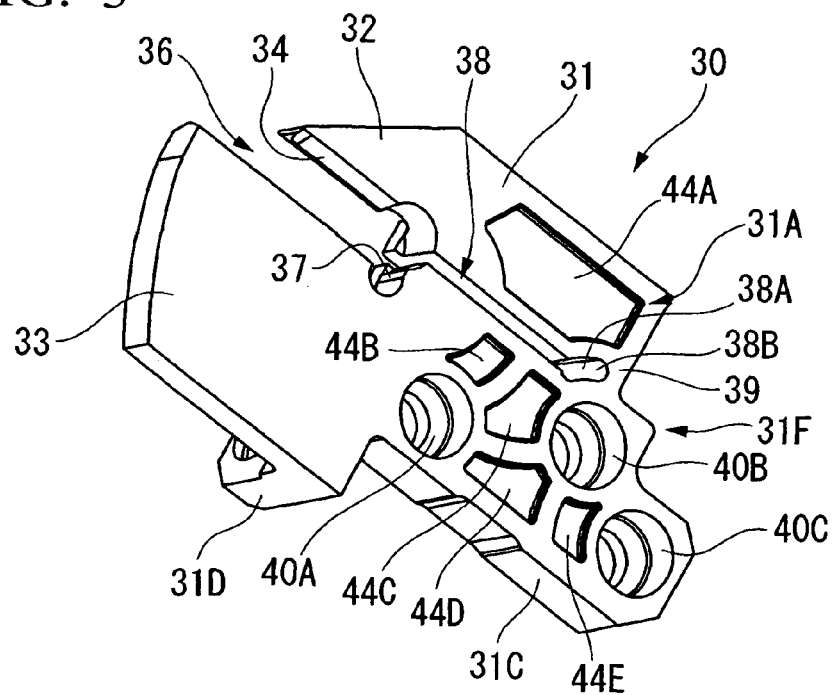
FIG. 3 is a perspective view when the embodiment shown in FIG. 1 is seen from the downside of the tip and the one side surface.
Figure 4:
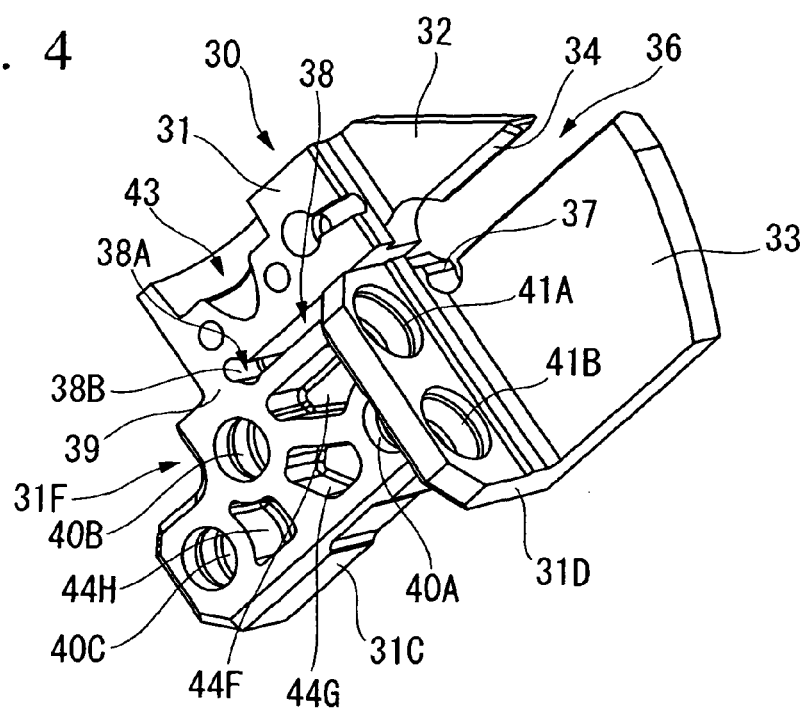
FIG. 4 is a perspective view when the embodiment shown in FIG. 1 is seen from the downside of the tip and the other side surface.

10: HOLDER
16: MOUNTING PORTION
22: CLAMP SCREW HOLE
30: HEAD MEMBER
31: HEAD MEMBER BODY
31A: ONE SIDE SURFACE OF HEAD MEMBER BODY
31B: THE OTHER SIDE SURFACE OF HEAD MEMBER BODY
31F: REAR END SURFACE OF HEAD MEMBER BODY
32: UPPER JAW PORTION
33: LOWER JAW PORTION
34: PRESSING SURFACE
35: PEDESTAL SURFACE
36: INSERT ATTACHMENT SEAT
38: SLIT
38A: BENT PORTION
38B: REAR WALL SURFACE OF BENT PORTION
39: CONNECTING PORTION
40A TO 40C: FIRST INSERTION HOLE
42: FIXING SCREW
43: COUNTERSUNK PORTION
44 (44A TO 44H): RECESS
45: INNER WALL SURFACE OF RECESS
46: BOTTOM SURFACE OF RECESS
47: CLAMP SCREW
50: CUTTING INSERT
51: INSERT BODY
52: CUTTING BLADE
60: TOOL BODY
70: CUTTING TOOL WITH DETACHABLE INSERT
O: AXIS OF HOLDER
P: IMAGINARY PLANE EXTENDING IN A DIRECTION IN WHICH PRESSING SURFACE AND PEDESTAL SURFACE FACE EACH OTHER ALONG EXTENSION DIRECTION OF SLIT
θ: ANGLE FORMED BY REAR WALL SURFACE AND REAR END SURFACE IN CROSS-SECTION ALONG EXTENSION DIRECTION OF SLIT AT REAR WALL SURFACE

BEST MODE FOR CARRYING OUT THE INVENTION

FIGS. 1 to 12 show one embodiment of a head member of the present invention, and FIGS. 13 to 16 show one embodiment for a cutting tool with detachable insert of the present invention on which the head member of the present embodiment is mounted. The cutting tool with detachable insert 70 of the present embodiment is a turning tool (cutting tool) with detachable insert which performs grooving or cutting-off on a rotating work material, and includes a substantially quadrangular prismatic holder 10 which is held by a tool rest of a machine tool, a head member 30 of the above embodiment which is mounted on the tip of the holder 10, and a cutting insert 50 which is clamped by the head member 30. Additionally, a tool body 60 is formed from the holder 10, and the head member 30 which is mounted at a tip portion of the holder 10.

The holder 10 is formed of steel and has a substantially square prismatic shape having an upper surface 11 and a lower surface 12 which face each other, and a pair of side surfaces 13A and 13B, and the rear end side (the upper right side in FIGS. 13 and 15 and the upper left side in FIGS. 14 and 16) of the holder is formed as a shank portion 14 which extends along an axis O of the square prism. Additionally, the tip side (the lower left side in FIGS. 13 and 15, and the lower right side in FIGS. 14 and 16) of the holder 10 is formed with a protruding portion 15 which protrudes towards the upside from the upper surface 11 of the holder 10, and the tip portion of the holder 10 formed with the protruding portion 15 is provided with a mounting portion 16 for mounting the head member 30.

The mounting portion 16 is formed in a recessed shape so that the tip surface of the holder 10 and the part of the tip portion on the side of one side surface 13A are cut out. Additionally, the mounting portion 16 includes a first receiving surface 17 which has a planar shape which extends parallel to the one side surface 13A of the holder 10, a second receiving surface 18 which has a planar shape which extends in a direction orthogonal to the first receiving surface 17 and is orthogonal to the axis O and which faces the tip side of the holder 10, and a third receiving surface 19 which has an upward planar shape which extends in a direction orthogonal to the first and second receiving surfaces 17 and 18.

Figure 13:
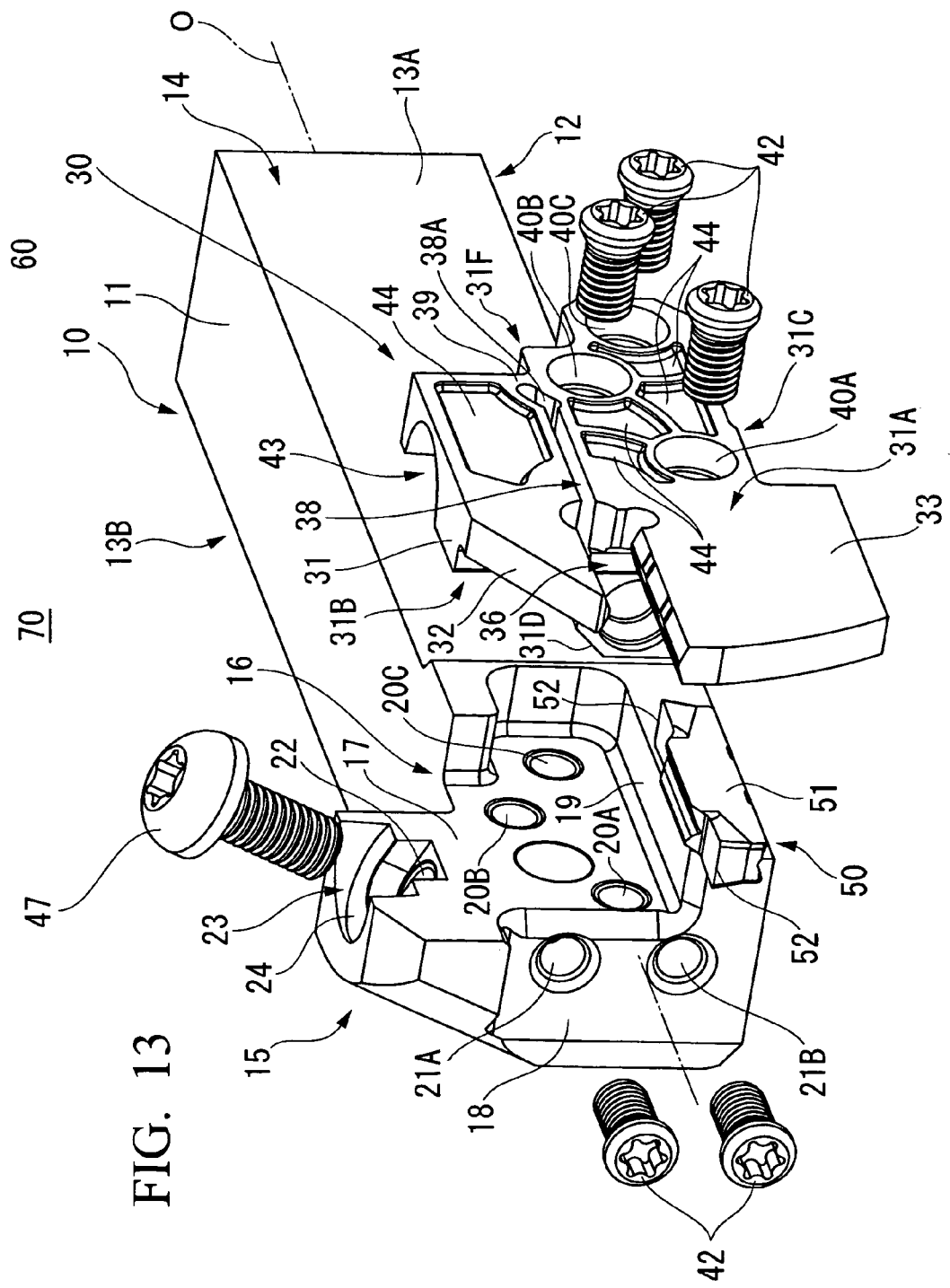
FIG. 13 is an exploded perspective view when an cutting tool with detachable insert of one embodiment of the present invention on which the head member shown in FIG. 1 is mounted is seen from the upside of the tip and one side surface of a holder.

Among the surfaces, the first receiving surface 17 is formed so as to be recessed from the one side surface 13A towards the other side surface 13B and extend up to the upper end of the protruding portion 15. Also, in the first receiving surface 17, three first fixing screw holes 20A to 20C are bored in the direction orthogonal to the first receiving surface 17 in the present embodiment. The first fixing screw holes 20A to 20C are formed so as to be lined up with each other in the direction of the axis O or be lined up in the front-back direction of the holder 10, and so as to open at the positions of respective apexes of a scalene triangle which is flat up and down and becomes upwardly convex as shown in FIG. 13.

Additionally, the second receiving surface 18 is arranged on the tip side in the direction of the axis O of the first receiving surface 17 in the orthogonal direction via a chamfered portion, and is formed so as to be recessed further towards the rear end side than the tip surface of the protruding portion 15, and have an L-shape as seen from the tip side. Two second fixing screw holes 21A and 21B bored in a direction orthogonal to the second receiving surface 18 are also opened in the second receiving surface 18 so as to be lined up in a direction which extends parallel to the first receiving surface 17 and orthogonal to the axis O, or be lined up in a perpendicular direction of the holder 10 in the present embodiment.

Moreover, the third receiving surface 19 is arranged between the first receiving surface 17 recessed towards the other side surface 13B, and the side surface of the tip portion of the holder 10 which faces the one side surface 13A, and is formed so as to orthogonal to the first receiving surface 17 and extend parallel to the axis O. Additionally, the third receiving surface 19 extends in the direction orthogonal to the second receiving surface 18 located on the tip side thereof via a chamfered portion. In addition, in the mounting portion 16 which has a recessed shape, the rear end portion thereof is formed in a U-shape so as to open towards the tip side as seen from the direction which faces the one side surface 13A, the first and third receiving surfaces 17 and 19 extend up to the rear end portion, and the first fixing screw hole 20C of the first fixing screw holes 20A to 20C at the rearmost end is bored in the rear end portion.

Additionally, the first fixing screw hole 20A of the first fixing screw holes 20A to 20C at the foremost end, and the second fixing screw holes 21A and 21B are arranged at mutually different positions in the direction which is orthogonal to the axis O and extends parallel to the first receiving surface 17, or in the perpendicular direction in the present embodiment. In the present embodiment, as shown in FIG. 13, the first fixing screw hole 20A on the tip side is arranged between the two second fixing screw holes 21A and 21B which are arranged up and down.

Moreover, a clamp screw hole 22 which inclines so as to be separated at a predetermined angle from the first receiving surface 17 as it moves downward in a plane orthogonal to the axis O towards the downside from the upper end of the protruding end is bored in the protruding portion 15. A stepped recess 23 which is opened more largely than the clamp screw hole 22 is formed around an upper end opening of the clamp screw hole 22, and the portion of the recess 23 on the one side surface 13A intersects the upper end of the first receiving surface 17, and is opened to the first receiving surface 17. Moreover, a stepped surface 24 of the recess 23 is made perpendicular to the centerline of the clamp screw hole 22, and is inclined at an obtuse angle with respect to the first receiving surface 17 so as to retreat gradually downward as it moves towards the one side surface 13A.

Figure 6:
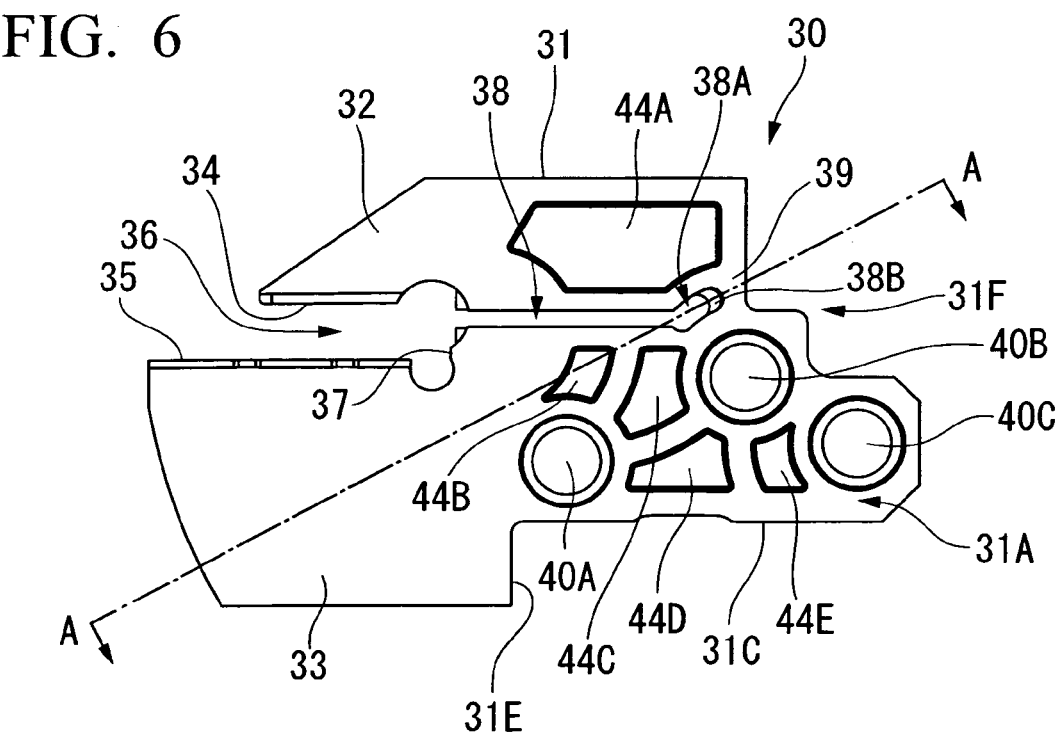
FIG. 6 is a side view when the embodiment shown in FIG. 1 is seen from the one side surface.
Figure 7:
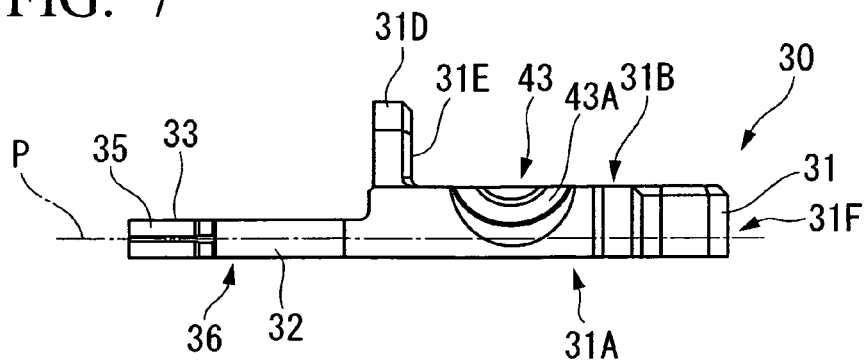
FIG. 7 is a plan view (top view) when the embodiment shown in FIG. 1 is seen from the upper surface.
Figure 8:
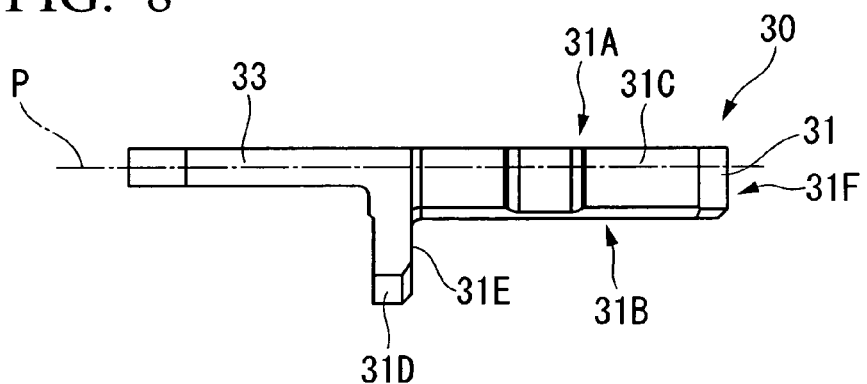
FIG. 8 is a bottom view (bottom view) when the embodiment shown in FIG. 1 is seen from the lower end surface.

The head member 30 of the present embodiment which is mounted on the mounting portion 16 of such a holder 10 is constituted by a head member body 31 which is also integrally formed of steel. The head member body 31 is formed substantially in the shape of a multi-stage flat plate in which a rear end portion (a right portion in FIGS. 6 to 9) thereof is thicker than a tip portion (a left portion in FIGS. 6 to 9) thereof by one step as shown in FIGS. 7 and 8.

In this rear end portion, one side surface (a lower side surface in FIG. 7 and an upper side surface in FIG. 8) 31A of the head member body 31 which faces the one side surface 13A of the holder 10 in an attached state of being attached to the holder 10, and the other side surface (an upper side surface in FIG. 7 and a lower side surface in FIG. 8) 31B opposite to the one side surface 31A are arranged in parallel. Here, in the head member body 31, as seen from above and below in the attached state as shown in FIGS. 7 and 8, one side surface 31A is formed in a planar shape along the direction (front-back direction) of the axis O, and the rear end portion of the other side surface 31B protrudes towards the other side surface 13B of the holder 10 by one step with respect to the tip portion.

Figure 5:
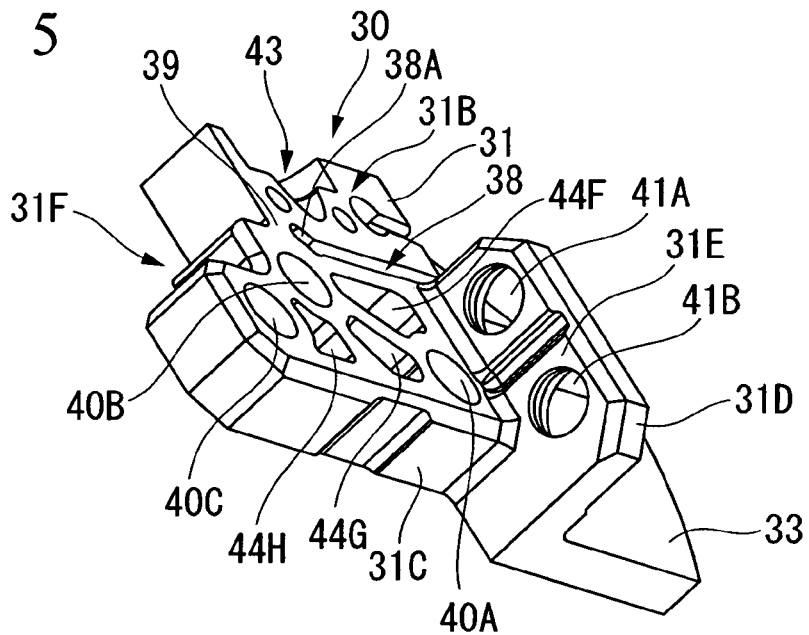
FIG. 5 is a perspective view when the embodiment shown in FIG. 1 is seen from the downside of the rear end and the other side surface.
Figure 11:
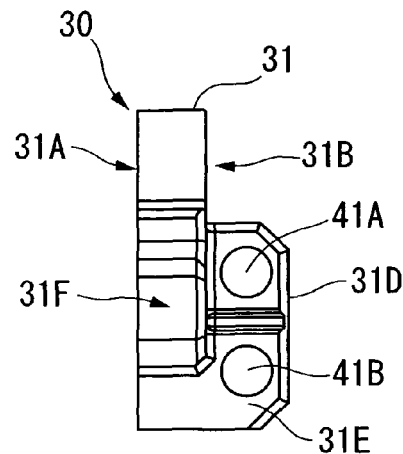
FIG. 11 is a rear view when the embodiment shown in FIG. 1 is seen from the rear end surface.

Additionally, a protruding wall portion 31D, which has an L-shaped flat plate shape as shown in FIGS. 5 and 11, is also formed integrally with the head member body 31 from a tip edge of a rear end portion of the protruding other side surface 31B to a lower end surface 31C of the rear end portion, and a back surface 31E which faces the rear end side of the protruding wall portion 31D extends in a direction perpendicular to the axis O in the attached state. In addition, the other side surface 31B at the rear end portion of the head member body 31 except for the protruding wall portion 31D is formed in a planar shape when seen from above and below as described above.

On the other hand, the tip portion of the head member body 31 which is made thinner by one step than the rear end portion is formed with a pair of jaw portions (an upper jaw portion 32 and a lower jaw portion 33) which extends towards the tip side along the one side surface 13A of the holder 10 in the attached state. Among the jaw portions, the upper jaw portion 32 that is one jaw portion in the present embodiment is provided with a pressing surface 34 which presses the insert 50 which will be described later from above, and the lower jaw portion 33 that is the other jaw portion is provided with a pedestal surface 35 which is arranged to face the pressing surface 34. Also, in the present embodiment, an insert attachment seat 36 which has a recessed shape opened towards the tip side and extending towards the rear end side, as shown in FIG. 6, is formed by the pressing surface 34 and the pedestal surface 35. In addition, as seen from the tip side as shown in FIG. 10, the pedestal surface 35 has an inverted convex V-shape which becomes convex towards the upside, and the pressing surface 34 has a convex V-shape which becomes convex towards the downside.

Moreover, a contacting surface 37 which faces the tip side perpendicularly to the axis O in the attached state is formed on the side of pedestal surface 35, deep in the insert attachment seat 36 or on the rear end side between the pressing surfaces 34 and the pedestal surface 35. Additionally, from between the contacting surface 37 and the pressing surface 34, a slit 38, which passes through between the side surfaces 31A and 31B of the rear end portion of the head member body 31 perpendicularly to the side surfaces 31A and 31B and further extends towards the rear end side from the rear end of the insert attachment seat 36, is formed. The upper jaw portion 32 is elastically deformable so as to deflect toward the lower jaw portion 33 as a connecting portion 39 with the lower jaw portion 33 at the rear end of the slit 38 is a fulcrum. In addition, the slit 38 extends parallel to the axis O on the tip side in communication with the insert attachment seat 36.

Figure 10:
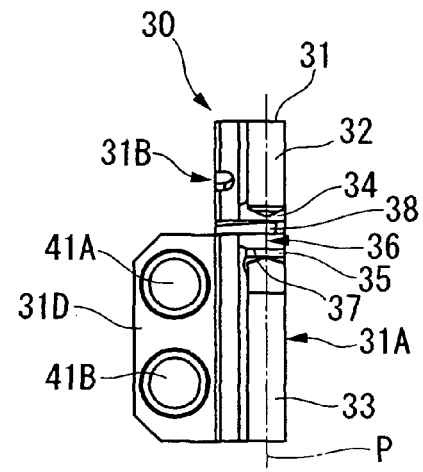
FIG. 10 is a front view when the embodiment shown in FIG. 1 is seen from the tip side.

Accordingly, an imaginary plane P in the present embodiment, as shown in FIG. 10, becomes a plane which extends in a direction in which the pressing surface 34 and the pedestal surface 35 face each other, or extends in the direction of a bisector of the V-shape formed by the pressing surface 34 and the V-shape formed by the pedestal surface 35, along the extension direction of the slit 38, or a direction further towards the rear end side from the rear end of the insert attachment seat 36. Additionally, both the side surfaces 31A and 31B of the head member body 31 are made parallel to the imaginary plane P in the present embodiment.

Figure 9:
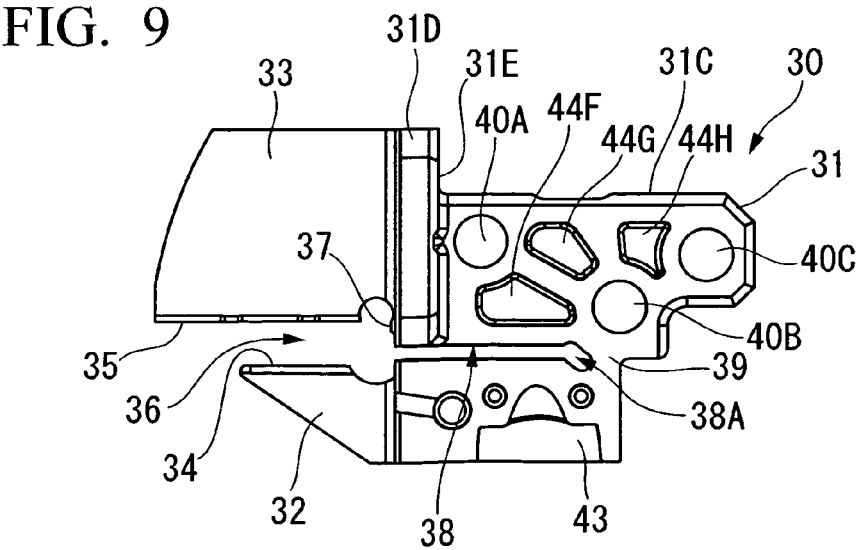
FIG. 9 is a side view when the embodiment shown in FIG. 1 is seen from the other side surface.

In addition, as shown in FIGS. 6 and 9, the lower jaw portion 33 is made continuous with a protruding wall portion 31D so as to protrude further towards the tip side than the upper jaw portion 32 and protrude further downward than the lower end surface 31C at the rear end portion of the head member body 31 and thereby have a lower surface flush with the protruding wall portion 31D. Additionally, the lower end surface 31C at the rear end portion is formed in a planar shape perpendicular to the side surfaces 31A and 31B, and extends parallel to the axis O in the attached state. It is noted herein that a shallow recess is formed in a substantially middle portion in the extension direction.

Such a head member 30 is seated so that the rear end portion of the head member body 31 is charged into the recessed mounting portion 16 at the tip of the holder 10, the other side surface 31B at the rear end portion is brought into close contact with the first receiving surface 17 of the mounting portion 16, the back surface 31E of the protruding wall portion 31D is brought into close contact with the second receiving surface 18, and the lower end surface 31C at the rear end portion is brought into close contact with the third receiving surface 19. Accordingly, the first receiving surface 17 is also arranged parallel to the imaginary plane P, and the clamp screw hole 22 is inclined in a direction gradually separated from the imaginary plane P as it moves downward, or towards the lower jaw portion 33, or in a direction towards the other side surface 13B of the holder 10 in the present embodiment.

Here, three first insertion holes 40A to 40C and two second insertion holes 41A and 41B are formed at positions corresponding to the first fixing screw holes 20A to 20C and the second fixing screw holes 21A and 21B in a state where the head member 30 is seated in this way, in the rear end portion of the head member body 31, and the protruding wall portion 31D. The first and second insertion holes 40A to 40C and 41A and 41B have a circular cross-section, respectively, and are formed so as to pass through the rear end portion and the protruding wall portion 31D. Additionally, the hole bottom side of the first and second insertion holes 40A to 40C and 41A and 41B are reduced in diameter so that the back surfaces of the heads of the fixing screws 42 which will be described later come into contact with the hole bottoms.

Additionally, in a state where the head member 30 is seated on the mounting portion 16 as described above, the first insertion holes 40A to 40C are made obliquely and slightly eccentric towards the tip side and upside of the holder 10 so as to be separated from the third receiving surface 19 and approach the second receiving surface 18 with respect to the centers of the first fixing screw holes 20A to 20C. Moreover, the centers of the second insertion holes 41A and 41B are made obliquely and slightly eccentric towards the one side surface 13A and the upside so as to be separated from the lower surface 12 of the holder 10 and approach the first receiving surface 17 with respect to the centers of the second fixing screw holes 21A and 21B.

Figure 14:
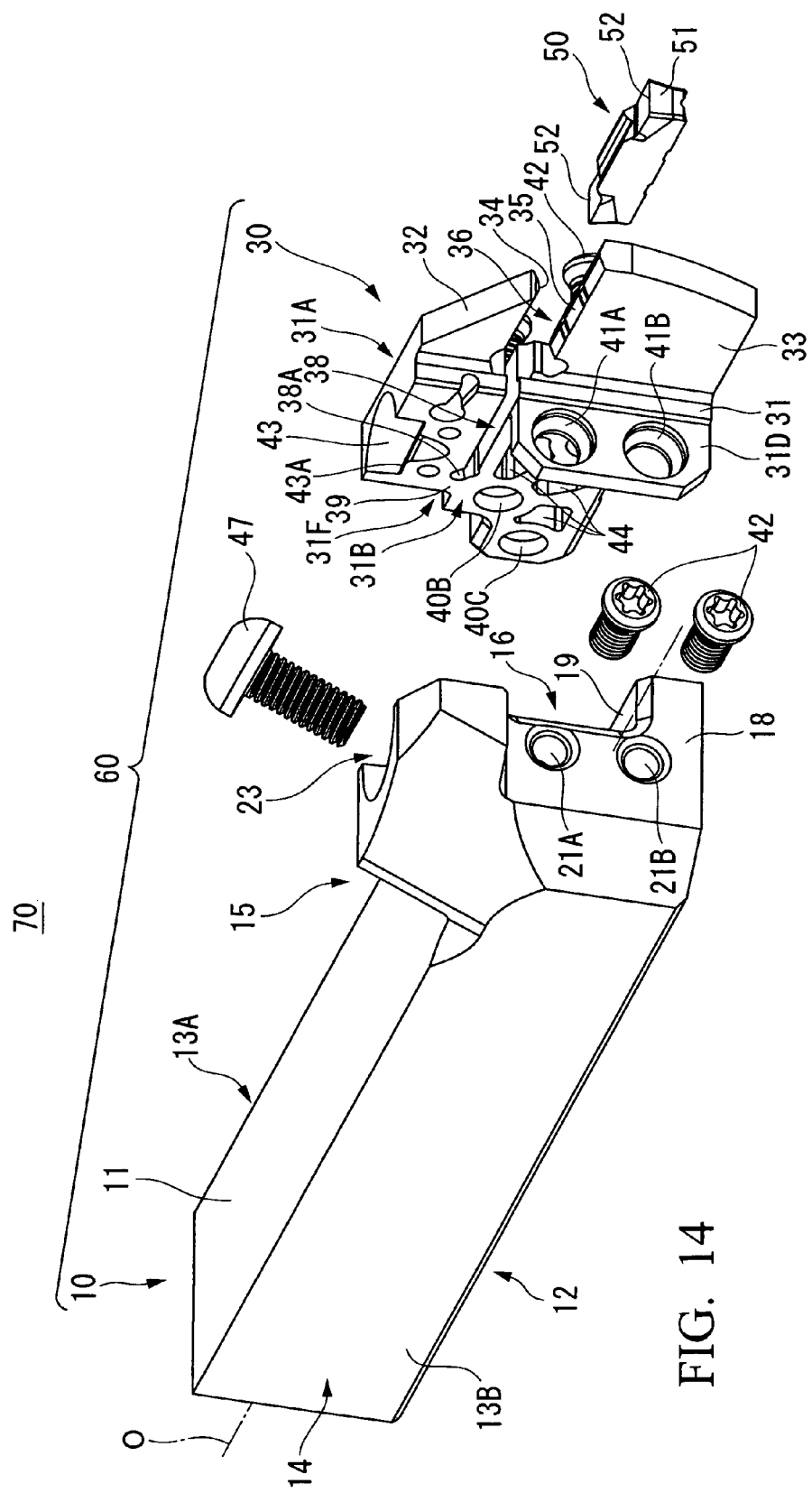
FIG. 14 is an exploded perspective view when the embodiment shown in FIG. 13 is seen from the upside of the tip and the other side surface of the holder.
Figure 15:
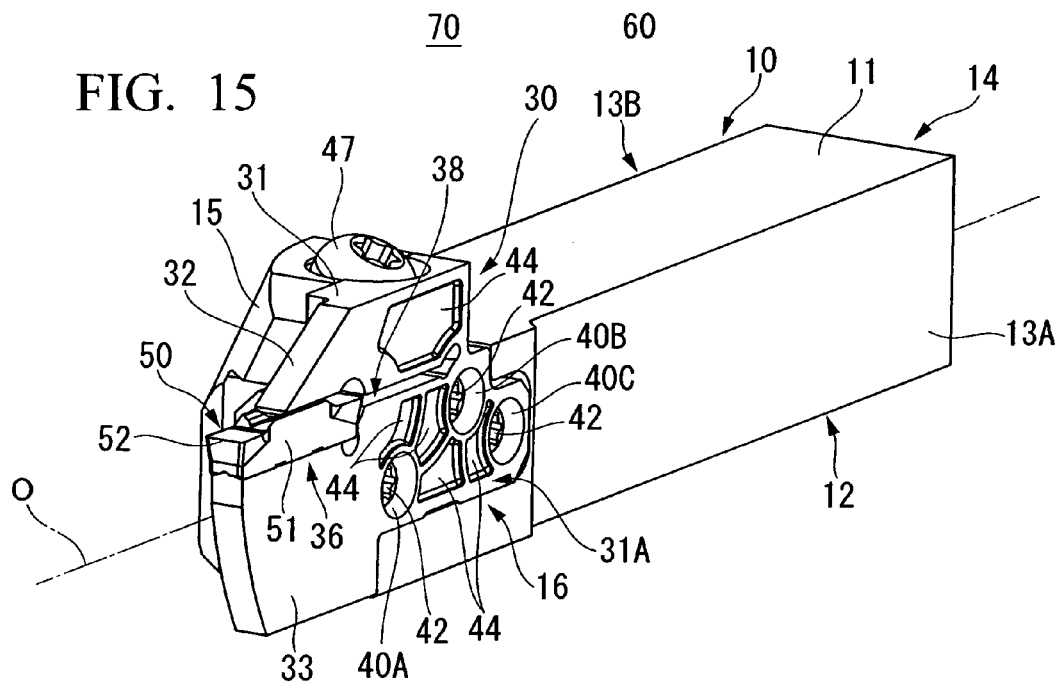
FIG. 15 is a perspective view of assembly when the embodiment shown in the drawing on which the head member and a cutting insert are mounted is seen from the upside of the tip and the one side surface.
Figure 16:
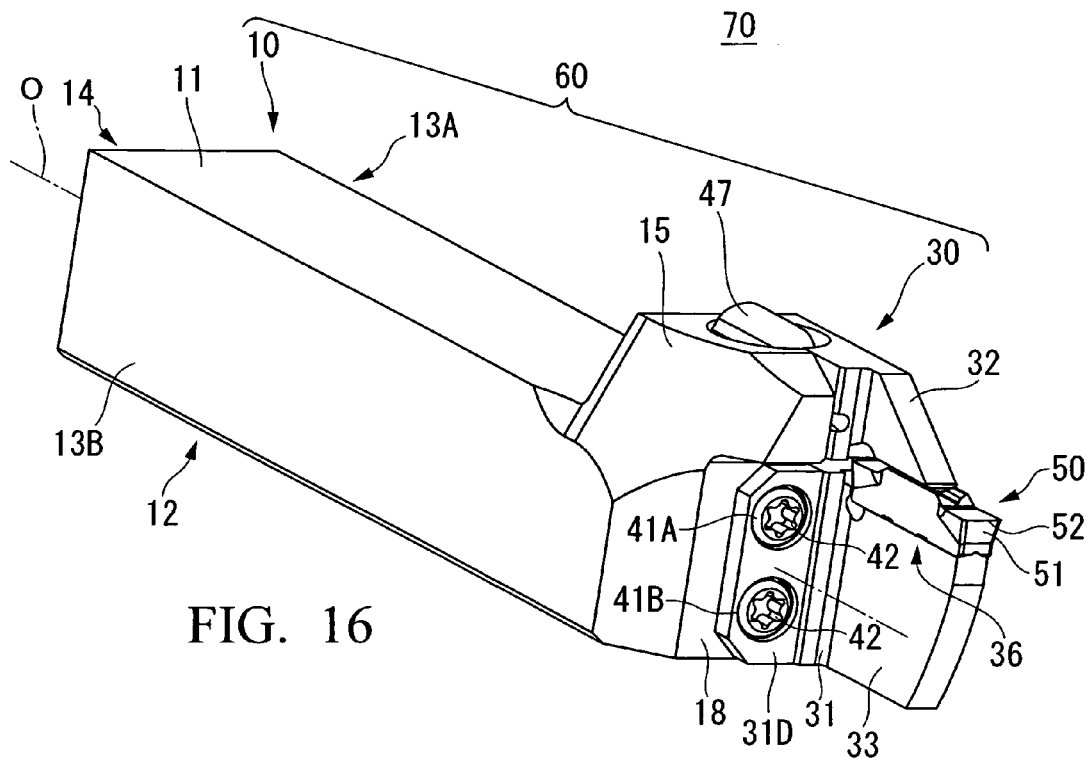
FIG. 16 is a perspective view of assembly when the embodiment shown in FIG. 13 on which the head member and the cutting insert are mounted is seen from the upside of the tip and the other side surface.

Accordingly, in such a seated state, inserting the fixing screws 42 through the first and second insertion holes 40A to 40C and 41A and 41B as shown in FIGS. 13 and 14, and screwing the fixing screws 42 into the first and second fixing screw holes 20A to 20C and 21A and 21B as shown in FIGS. 15 and 16. Thereby, the head member 30 is attached to the mounting portion 16 as the above attached state, as the other side surface 31B of the rear end portion of the head member body 31 is pressed against the first receiving surface 17, the back surface 31E of the protruding wall portion 31D is pressed against the second receiving surface 18, and the lower end surface 31C of the rear end portion is pressed against and fixed to the third receiving surface 19.

In addition, a rear end surface 31F of the head member body 31 is formed so as to be made perpendicular to the side surfaces 31A and 31B, and face the lower end surface 31C while assuming a stairway shape towards the rear end side as shown in FIG. 6 in side view which faces the one side surface 31A. Additionally, a rectangular convex portion formed by a stepped portion at the rearmost end in the stairway and the lower end surface 31C is housed in a U-shaped portion, which is opened towards the tip side, on the rear end side of the mounting portion 16, and the convex portion is formed with the first insertion hole 40C at the rearmost end in the first insertion holes 40A to 40C. In this regard, the rear end surface 31F is spaced from the wall surface of the mounting portion 16 which faces the tip side in the attached state so as not contact the wall surface. Additionally, the first insertion hole 40A at the foremost end is opened to the vicinity of the back surface 31E of the protruding wall portion 31D, and opened at the position nearest to the lower end surface 31C among the three insertion holes 40A to 40C.

Moreover, the first insertion hole 40B which is located between the first insertion holes 40A and 40C, and is located closest to the upper jaw portion 32 in the three first insertion holes 40A to 40C is formed inside stepped portion located upper and further in fore-end side in one step than the convex portion in the side view. In this case, the distance from the first insertion hole 40A at the foremost end is made greater than the distance from the first insertion hole 40C at the rearmost end. Additionally, in this side view, the opening of the first insertion hole 40B on the side of the one side surface 31A is arranged so that the upper edge thereof touches or intersects an extension line of a lower surface of the slit 38 of the portion which extends parallel to the axis O from the rear end of the insert attachment seat 36.

A rear end portion of the slit 38 is formed as a bent portion 38A which is bent so as to extend towards the upper jaw portion 32 on the upside as it moves towards the rear end side as shown in FIG. 6, and the bent portion 38A is formed at a distance from the opening of the first insertion hole 40B so as to have a circular-arc shape which is coaxial with the first insertion hole 40B which is located in proximity with the rear end side of the slit 38. Accordingly, in the present embodiment, the portion between a rear wall surface 38B of the rear end of the bent portion 38A which faces the tip side, and the rear end surface 31F of the head member body 31 is formed as the connecting portion 39, and the extension direction of the slit 38 in the bent portion 38A becomes a tangential direction of the circular arc formed by the bent portion 38A. In addition, the rear wall surface 38B is formed as a concave surface such that a cross-section along the above imaginary plane P has a concave circular arc in the present embodiment.

Here, the connecting portion 39 is located right above the first insertion hole 40B in the vicinity of an upper front corner portion of a stepped portion in which the first insertion hole 40B is formed. In the present embodiment, the connecting portion 39 is arranged on the extension line to the rear end side of the pressing surface 34 of the upper jaw portion 32, or at a position slightly higher than the extension line. In addition, the width of the bent portion 38A in the radial direction of the circular arc is made slightly greater than the width of the slit 38 which extends parallel to the axis O.

Figure 12:
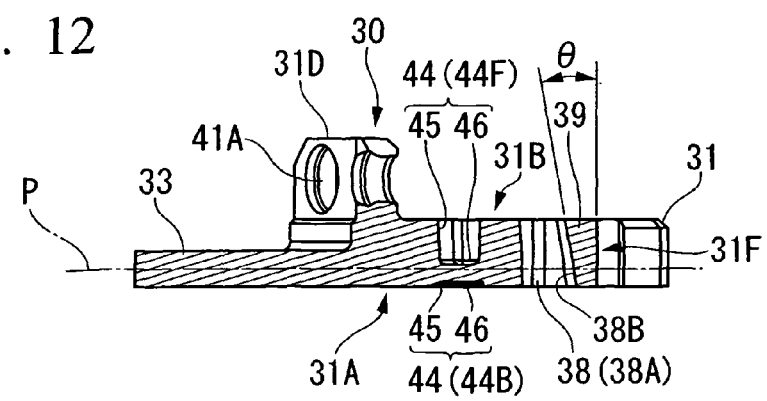
FIG. 12 is a sectional view taken along an A-A line in FIG. 6.

Also, the rear wall surface 38B of the slit 38 deep in the bent portion 38A which faces the tip side, as shown in FIG. 12, is formed so as to incline towards the tip side as it moves from the one side surface 31A of the head member body 31 towards the other side surface 31B thereof. Thereby, the connecting portion 39 formed between the rear wall surface 38B and the rear end surface 31F of the head member body 31 perpendicular to the side surfaces 31A and 31B is formed so that the width thereof in the extension direction, as shown in FIG. 12, becomes gradually wider in a direction towards the other side surface 31B from the one side surface 31A, or in a separating direction (a direction upwards from below in FIG. 12) in which the clamp screw hole 22 formed in the holder 10 is gradually separated from the imaginary plane P as it moves towards the lower jaw portion 33.

In addition, in the present embodiment, connecting portion 39 has a trapezoidal cross-section so that the width thereof in the extension direction becomes wider in the separating direction in a constant ratio as shown in FIG. 12, in an A-A cross-section along the extension direction (tangential direction) in the rear wall surface 38B in the bent portion 38A of the rear end of the slit 38 as shown in FIG. 6. Here, in this cross-section, the rear wall surface 38B and the rear end surface 31F, as shown in FIG. 12, is formed in a direction in which the surfaces intersect each other at an angle θ within a range of 5° to 15°.

A countersunk portion 43 which is opened to the upper surface of the upper jaw portion 32 and the other side surface 31B is formed closer to the tip side than the connecting portion 39 in the upper jaw portion 32. The countersunk portion 43 communicates with the recess 23 which is opened to the upper surface of the protruding portion 15 of the holder 10 in the attached state, and inclines so as to have a circular cross-sectional shape about the centerline of the clamp screw hole 22. Moreover, a bottom surface 43A of the countersunk portion 43, as shown in FIG. 7, is formed in a circular-arc shape, is inclined at an acute angle with respect to the other side surface 31B so as to retreat gradually downward as it moves towards the one side surface 31A of the head member body 31 and the rear end side, and is arranged so as to protrude further than a stepped surface 24 of the recess 23 by one step towards the direction of the centerline of the clamp screw hole 22 in the attached state.

In addition, in the head member 30 of the present embodiment, the side surfaces 31A and 31B of the head member body 31 are formed with recesses 44 which are recessed from the side surfaces 31A and 31B which are made planar in top and bottom views as described above. The recess 44, as shown in, for example, FIG. 12, is formed so as to have an inner wall surface 45 which intersects the side surfaces 31A and 31B at an angle, and is continuous around the inner periphery of the recess 44, and a bottom surface 46 which is connected to the inner wall surface 45 while intersecting the inner walls surface 45 at an angle over its whole periphery, and is parallel to the side surfaces 31A and 31B. Additionally, the recess 44 is formed so as not to pass through the head member body 31 and so as not to be opened to the tip surface, rear end surface 31F, upper surface, and lower end surface 31C of the head member body 31, the slit 38, and the first insertion holes 40A to 40C, and is formed so that the recesses 44 also do not communicate with each other.

Here, the head member body 31 is formed with a plurality of recesses 44. That is, both of the side surface 31A which faces the front side (the one side surface 13A of the holder 10) in the attached state, and the other side surface 31B which faces the back side (the first receiving surface 17 of the mounting portion 16) are respectively formed with a plurality of the recesses 44. In this regard, in the front and back side surfaces 31A and 31B, the recess 44 is formed only at the rear end portion which is made thicker by one step in the present embodiment, and is not formed in the tip portion and protruding wall portion 31D in which the upper and lower jaw portions 32 and 33 are formed.

Among the surfaces, as shown in FIG. 6, the one side surface 31A on the front side is formed with five recesses 44A to 44E, and the first recess 44A that is some (one in the present embodiment) of the recesses is formed on the side of the upper jaw portion 32 above the slit 38. The inner wall surface 45 of the recess 44A extends so as to leave a substantially constant distance between the slit 38 including the bent portion 38A, the upper surface of the head member body 31, and the rear end surface 31F. And when seen from a side, in the tip side, the upper portion thereof inclines straight towards the downside and the tip side, and the lower portion thereof is connected to the tip of the upper portion and inclines and retreats while being bent in a convex shape towards the downside with respect to the rear end side, and surrounds the periphery of the recess 44A.

Additionally, among the second to fifth recesses 44B to 44E formed on the side of the lower jaw portion 33 below the slit 38, the second recess 44B on the tip side is formed between the first insertion hole 40A and the slit 38, the third recess 44C on the upper side and the fourth recess 44D on the lower side are formed between the first and second insertion holes 40A and 40B, and the fifth recess 44E is formed on the tip side of the third insertion hole 40C on the lower side of the second insertion hole 40B. In the second to fifth recesses 44B to 44E, a substantially constant distance is also left between the slit 38 or the openings of the first to third insertion holes 40A to 40C and the lower end surface 31C. Additionally, the distance between the adjacent recesses 44B to 44E is slightly greater than this distance, and is also set to a constant distance.

In addition, the portions between the adjacent recesses 44B to 44E are formed so that the portion between the second and third recesses 44B and 44C and the portion between the third and fourth recesses 44C and 44D radially extend from the first insertion hole 40A, and similarly, the portion between the third and fourth recesses 44C and 44D, and the portion between the fourth and fifth recesses 44D and 44E extend radially from the second insertion hole 40B. In this regard, while the respective portion between the second to fourth recesses 44B to 44D is bent in a slightly convex shape towards the downside of the rear end of the holder 10 in the attached state, the portions between the fourth and fifth recesses 44D and 44E are bent in a slightly convex shape towards the tip side. Additionally, the inner wall surface 45 on the tip side of the second recess 44B extends so as to incline and retreat while being bent in a convex shape with respect to the rear end side towards the upside, so as to run along a convexly bent extension line formed by the lower portion on the tip side of the first recess 44A.

As shown in FIG. 9, on the lower side (the upper side in FIG. 9) than the slit 38 of the other side surface 31B on the back side, three recesses 44F to 44H including an upper sixth recess 44F and a lower seventh recess 44G between the first and second insertion holes 40A and 40B, and an eighth recess 44H on the tip side of the third insertion hole 40C on the lower side of the second insertion hole 40B are also formed at a substantially constant distance between the slit 38 or the openings of the first to third insertion holes 40A to 40C and the lower end surfaces 31C. Additionally, the portion between the adjacent sixth and seventh recesses 44F and 44G radially extends from the first insertion hole 40A, and the portion between the sixth and seventh recesses 44F and 44G and the portion between the seventh and eighth recesses 44G and 44H radially extend from the second insertion hole 40B.

In this regard, the portion between the sixth and seventh recesses 44F and 44G extends straight with a constant width so as to connect the first and second insertion holes 40A and 40B linearly, and the portion between the seventh and eighth recesses 44G and 44H is formed so that the inner wall surface 45 of the seventh recess 44G inclines towards the tip side as it moves towards the lower end surface 31C from the second insertion hole 40B, and the width thereof becomes gradually wider. In this way, in the present embodiment, the recesses 44 are formed in the front and back side surfaces 31A and 31B so that the shapes or numbers thereof become different from each other. In particular, all the recesses 44 have different shapes in the side surface 31A and 31B without coinciding with each other as seen from a direction which faces the side surfaces 31A or 31B.

Moreover, in the present embodiment, the depths of the plurality of recesses 44 from the side surfaces 31A or 31B, or the depths from the side surfaces 31A or 31B to the bottom surfaces 46 of the recesses 44 are different from each other. Specifically, as shown in FIG. 12, the depths from the side surfaces 31A of the first to fifth recesses 44A to 44E, which are formed in the one side surface 31A in the front side, are significantly smaller than the depths from the side surface 31B of the sixth to eighth recesses 44F to 44H, which are formed in the other side surface 31B in the backside. Additionally, the depths of the recesses 44A to 44E and the recesses 44F to 44H on the side of the respective side surfaces 31A and 31B are made equal to each other. Thereby, the portions between the bottom surfaces 46 of the recesses 44A to 44E and the bottom surfaces 46 of the recesses 44F to 44H in both the side surfaces 31A and 31B, as shown in FIG. 12, are formed so as to be arranged substantially in the middle in its thickness direction of the thin-walled lower jaw portion 33 of the tip portion of the head member body 31.

In addition, the head member 30 including such recesses 44 may be manufactured so that the recesses 44 are formed by an end mill after the head member body 31 in which the recesses 44 are not formed is shaved and shaped from a steel material. However, for example, the head member 30 may be manufactured by a MIM (Metal Injection Molding) method. In the method, injection-molding a material, which is given fluidity by kneading base fine powder of a steel material, which becomes the head member body 31, and a binder, such as resin, into a split die where the shape of the head member body 31 is reversed. After that, removing the binder by heating to sinter the base fine powder. In a case where the head member is manufactured by the MIM method, a draft angle which inclines to the outside as it moves towards the side surfaces 31A and 31B from the bottom surfaces 46 is given to the inner wall surfaces 45 of the recesses 44.

Additionally, even in cases where the head member is manufactured by the MIM method, or is manufactured by shaving, it is desirable that the manufactured head member body 31 be subjected to the shot peening which ejects hard pellet particles onto the surface of the head member body, thereby promoting surface hardening.

The cutting insert 50 for grooving and cutting-off attached to the insert attachment seat 36 of such a head member 30 includes an insert body 51 the profile of which is formed in the shape of a square bar by a hard material, such as cemented carbide, having a substantially rectangular cross-section. Additionally, portions which have a concave V-shaped cross-section are formed at the lower surface and the central portion of upper surface of the insert body 51. These surfaces are enabled to come into contact with the pressing surface 34 and the pedestal surface 35 which have a convex V-shaped cross-section so as to coincide bisectors of the V-shaped form of the surfaces. Additionally, cutting faces are respectively formed at positions which have retreated by one step from the central portions, at both ends of the upper surface, and cutting blades 52 used for grooving or cutting-off are formed at both end edges of the cutting faces.

With respect to the head member 30 in the attached state, such a cutting insert 50 is inserted into the insert attachment seat 36 from the tip side so that one cutting blade 52 thereof faces the tip side, and the concave V-shaped lower surface and the central portion of upper surface are made to face the pedestal surface 35 and the pressing surface 34, and is positioned in the direction of the axis O where the end surface of the insert body 51 which faces the rear end side comes into contact with the contacting surface 37.

Moreover, as shown in FIGS. 13 and 14, the clamp screw 47 is screwed into the clamp screw hole 22 bored in the protruding portion 15 of the holder 10, whereby the head of the clamp screw 47 comes into contact with the bottom surface 43A of the countersunk portion 43 of the head member body 31, and the clamp screw 47 engages the upper jaw portion 32. Next, the upper jaw portion 32 is pressed in the direction in which the clamp screw hole 22 is bored, and is elastically deformed so as to deflect towards the lower jaw portion 33 with the connecting portion 39 as a fulcrum. As a result, the cutting tool with detachable insert 70 of the present embodiment is constructed such that the pressing surface 34 of the upper jaw portion 32 presses the insert body 51 towards the pedestal surface 35, and thereby the cutting insert 50 is clamped.

As the upper jaw portion 32 is pressed while inclining in a direction the clamp screw hole 22, into which the clamp screw 47 is screwed, is bored or in the direction separated from the imaginary plane P, where by the upper jaw portion 32 is deflected towards the lower jaw portion 33 as described above, and receives a force even in this separating direction or in a direction which inclines towards the other side surface 13B of the holder 10. However, in the head member 30, the tool body 60, and the cutting tool with detachable insert 70 including the head member 30, the tool body 60 and the holder 10 of the above construction, the connecting portion 39 which becomes a fulcrum of the elastic deformation of the upper jaw portion 32 is formed so as to become wider towards the separating direction. Thus, the connecting portion 39 hardly deforms towards the separating direction.

Accordingly, the countersunk portion 43 of the upper surface of the upper jaw portion 32 is made to engage the clamp screw 47, thereby pressing the upper jaw portion 32 at a position near the insert attachment seat 36. And the clamp screw hole 22 is inclined in the separating direction with respect to the imaginary plane P of the head member 30, and is formed on the holder 10. Thereby, even if the clamp screw 47 with a large screw diameter is screwed into the clamp screw hole 22, the inclination of the upper jaw portion 32 during clamping the cutting insert 50 is prevented, so that the pressing surface 34 can be made to approach the pedestal surface 35 straight along the imaginary plane P. For example, as in the present embodiment, in the case where the pressing surface 34 and the pedestal surface 35 are formed in the shape of a convex V-shaped cross-section, and the lower surface and central portions of the upper surface of the insert body 51 are formed in the shape of a convex V-shaped cross-section, the insert body 51 can be clamped in a state where the V-shaped bisectors exactly coincide with each other on the imaginary plane P.

For this reason, according to the cutting tool with detachable insert 70 including the head member 30 and the holder 10, the tool body 60, and the head member 30, a large clamping force which is caused by using a large-diameter clamp screw 47, or pressing the upper jaw portion 32 at a position near the insert attachment seat 36 can be made to act to the insert body 51 uniformly along the imaginary plane P without biasing. Therefore, it is possible to prevent the cutting insert 50 from inclining during clamping or prevent clamping from becoming unstable. Accordingly, it is possible to prevent clattering from occurring in the cutting insert 50 during grooving or cutting-off, thereby performing high-precision machining smoothly.

Additionally, in the head member 30 of the present embodiment, the connecting portion 39 which becomes wider towards the separating direction in this way is formed as the connecting portion extends in a direction in which the rear wall surface 38B, and the rear end surface 31F of the head member body 31 intersect each other at an angle of θ within a range of 5° to 15° in a cross-section along the extension direction of the slit 38 in the rear wall surface 38B of the slit 38. Thereby, a situation where the elastic deformation itself of the upper jaw portion 32 towards the lower jaw portion 33 is hindered can be prevented while reliably exhibiting the above-described effects. That is, if the angle θ is smaller than the above range, the inclination of the upper jaw portion cannot be suppressed. On the other hand, when the angle is greater than the above range, the elastic deformation itself using the connecting portion 39 as a fulcrum may become difficult.

In addition, in the present embodiment, as described above, the rear end surface 31F of the head member body 31 is made perpendicular to the side surfaces 31A and 31B, and the rear wall surface 38B of the bent portion 38A of the rear end of the slit 38 is inclined so that the connecting portion 39 becomes gradually wider and thicker in the extension direction as it moves towards the separating direction. However, contrary to this, the rear wall surface 38B may be made perpendicular to the side surfaces 31A and 31B, and the rear end surface 31F may incline towards the rear end side as it moves towards the side surface 31B from the side surface 31A, or the connecting portion 39 may be formed so as to become wider by inclining both of the rear wall surface 38B and the rear end surface 31F so as to be separated from each other as it moves towards the side surface 31B from the side surface 31A.

Additionally, in the present embodiment, the slit 38 in which such a rear wall surface 38B is formed has the bent portion 38A which is bent so as to extend towards the upper jaw portion 32 after extend parallel to the axis O from the rear end of the insert attachment seat 36 or extend parallel to the pressing surface 34 and pedestal surface 35 of the insert attachment seat 36. Thereby, even if the insertion hole (the first insertion hole 40B) through which a fixing screw 42, which fixes the head member body 31 on the extension line of the slit 38, is inserted is formed, the connecting portion 39 which becomes a fulcrum for the deflection of the upper jaw portion 32 can be arranged on the rear end side which is further separated from the insert attachment seat 36.

For this reason, as described above, the upper jaw portion 32 can be deflected straight towards the lower jaw portion 33 along the imaginary plane P, and a change in the inclination of the pressing surface 34 caused by this deflection as seen from a direction which faces the imaginary plane P can also be made as small as possible. Accordingly, according to the present embodiment, together with the prevention of the inclination of the upper jaw portion 32 in the separating direction, it is possible to bring the pressing surface 34 into close contact with the central portion of the upper surface of the insert body 51 more reliably, thereby pressing the pressing surface 34 against the insert body 51, and it is possible to clamp the cutting insert 50 more stably and firmly. Additionally, even if the insertion holes are formed on the extension line of the slit 38 in this way, it is possible to avoid the interference of the insertion holes. Thus, compactness can also be achieved while the degree of freedom in the design of the head member body 31 increases.

Moreover, in the present embodiment, the bent portion 38A is formed at a distance from the opening of the first insertion hole 40B on the side of the side surface 31A so as to have a circular-arc shape which is coaxial with the first insertion hole 40B. For this reason, according to the present embodiment, even if the bent portion 38A is formed at the rear end of the slit 38 in this way, the wall thickness of the circular-arc portion between the bent portion 38A and the first insertion hole 40B can be uniformly secured, and breakage can be prevented from occurring in the circular-arc portion due to the fastening force of the fixing screw 42 inserted through the first insertion hole 40B.

In addition, when the length of the bent portion 38A along the peripheral direction of the first insertion hole 40B is too short, the position of the connecting portion 39 cannot be arranged on the rear end side. Additionally, when the length of the bent portion 38A along the peripheral direction is too long, the circular-arc portion between the bent portion 38A and the first insertion hole 40B also becomes too long, and breakage may be caused even if uniform wall thickness is somehow secured. For this reason, it is desirable that the bent portion 38A have a length such that the connecting portion 39 is formed right above the first insertion hole 40B as in the present embodiment.

In the head member 30 of the present embodiment, the recesses 44 as described above are formed in the side surfaces 31A and 31B, and each recess 44 has the continuous inner wall surface 45 therearound, and the bottom surface 46 which is connected to the inner wall surface 45 over its whole periphery. Therefore, between the recess 44 and the upper surface, the rear end surface 31F, or the lower end surface 31C of the head member body 31, at least two rib-like portions which rise and protrude with respect to the bottom surface 46 of the recess 44 are formed on both sides of the recess 44 across the recess 44. In particular, in the present embodiment, the side surfaces 31A and 31B are formed with a plurality of recesses 44A to 44H. Thus, such rib-like portions are also formed between the inner wall surfaces 45 of the adjacent recesses 44B to 44E.

Accordingly, even if vibration is generated in the insert body 51 from the cutting blades 52 facing the tip side of the cutting insert 50 during the above-described grooving or cutting-off, the vibration is dispersed via such a plurality of rib-like portions when propagating to the holder 10 from the head member 30, and does not propagate directly to the holder 10. Therefore, it is possible to prevent occurrence of a situation where the vibration concentrates and chatter vibration is generated in the holder 10. Additionally, since the weight reduction of the head member body 31 can be achieved by the recess 44, the vibration itself is easy to attenuate and it is possible to suppress generation of chatter vibration by this as well.

For this reason, according to the present embodiment, even if the amount of protrusion of the cutting blades 52 is increased during grooving or cutting-off, it is possible to prevent occurrence of a situation where cutting operation is hindered and deterioration of machining accuracy is caused, due to such chatter vibration. As a result, it is possible to perform high-precision and high-quality cutting operation stably and smoothly. Additionally, since the surface area of the head member body 31 is increased by forming the recess 44 in this way, the cutting heat generated in the cutting insert 50 during cutting can also be rapidly radiated via the head member 30. As a result, even in dry cutting, it is possible to prevent thermal damage from occurring in the cutting insert 50, or to prevent temperature adhesion of chips from occurring in the cutting insert 50.

On the other hand, even if the wall thickness of the head member body 31 is reduced by forming such a recess 44, the recess 44 in the head member 30 of the present embodiment does not pass through the head member body 31 unlike the first and second insertion holes 40A to 40C and 41A and 41B. Additionally, the recess 44 is not opened to a peripheral end surface (the tip surface, the rear end surface 31F, the upper surface, or the lower end surface 31C) located between the side surfaces 31A and 31B of the head member body 31, unlike the insert attachment seat 36, the slit 38, or the countersunk portion 43, and the above-described rib-like portions are formed around the recess 44. Therefore, the strength or rigidity of the head member body 31 is not significantly impaired. Especially, by performing shot peening on the head member body 31 as described above, it is possible to improve the strength or rigidity of the head member 30 more reliably to achieve more stabilized cutting.

However, even if the rib-like portions are formed or the shot peening is performed in this way, when the total volume of the recesses 44 becomes excessively large, degradation of the strength or rigidity of the head member body 31 cannot be avoided. On the other hand, the above-described effects including vibration prevention and cutting-heat radiation become insufficient if the total volume of the recesses 44 is too small. Therefore, it is desirable that the total volume of the recesses 44 be set to a range of 2% to 15% of the volume of the head member body 31 in which the recesses 44 are not formed. In addition, although the bottom surface 46 parallel to the side surfaces 31A and 31B in which each recess 44 intersects the inner wall surface 45 at an angle is provided in the present embodiment, for example, the recess may formed as a concave spherical shape which has a concave curve where the inner wall surfaces 45 and the bottom surface 46 are smoothly continuous.

Additionally, in the present embodiment, as described above, the front and back side surfaces 31A and 31B that are the one side surface 31A and the other side surface 31B of the head member body 31 are respectively formed with the recesses 44A to 44E and the recesses 44F to 44H, and the recesses 44 are formed in mutually different shapes in a projection view as seen from directions which face the side surfaces 31A and 31B, or as seen from the side of either of the side surfaces 31A and 31B. For this reason, since the rib-like portions formed around the recesses 44A to 44E and the recesses 44F to 44H are also formed in mutually different shapes, vibration can be more reliably dispersed, vibration can be mutually cancelled, and the propagation of vibration to the holder 10 can be more effectively suppressed.

Moreover, in the present embodiment, the depths of the recesses 44A to 44E and the recesses 44F to 44H, which are formed in the front and back side surfaces 31A and 31B, from the side surfaces 31A and 31B are different from each other, and thereby the heights of the rib-like portions are also different from each other on the front and back side surfaces. Therefore, dispersed vibration can be mutually cancelled more reliably. In addition, in the present embodiment, the depths between the recesses 44A to 44E of the one side surface 31A and between the recesses 44F to 44H of the other side surface 31B are made equal to each other. However, the recesses 44 which are different in depth from each other may be formed in at least one of the side surfaces 31A and 31B so long as the recesses 44 do not pass through the head member body 31.

INDUSTRIAL APPLICABILITY

According to the present invention, it is possible to provide a head member for a cutting tool with detachable insert capable of clamping a cutting insert stably and firmly to achieve the improvement in machining accuracy, a tool body in which the head member is mounted on a tip portion of a holder, and an cutting tool with detachable insert in which an insert is clamped by the head member attached to the tip portion of the holder.

The invention claimed is:

1. A head member for a cutting tool with detachable insert comprising a head member body formed with an insert attachment seat to which a cutting insert having cutting blades is detachably attached, and constituting the cutting tool by being mounted to a tip portion of a holder, wherein the insert attachment seat is formed by a pressing surface of one jaw portion and a pedestal surface of the other jaw portion in a pair of jaw portions formed in the head member body so as to be opened towards the tip side and extend towards a rear end side of the head member body, wherein from a rear end of the insert attachment seat, a slit is provided so as to further extend towards the rear end side, wherein a clamp screw engaged with the one jaw portion is screwed into the holder while inclining in a direction separated from an imaginary plane as it moves towards the other jaw portion, the imaginary plane extending along an extension direction of the slit and in the direction of a bisector of a V-shape formed by the pressing surface and the V-shape formed by the pedestal surface, whereby the one jaw portion is enabled to elastically deform towards the other jaw portion by using as a fulcrum a connecting portion of the pair of jaw portions formed between the rear wall surface of the slit which faces the tip side, and the rear end surface of the head member body located on the extension direction of the rear wall surface, and wherein the width of the connecting portion along the extension direction is formed so as to become gradually wider in a direction from one side surface of the head member body towards the other side surface pressed by the head member body when the head member is mounted on the tip portion of the holder, the connecting portion is formed so that the rear wall surface and the rear end surface intersect each other within a range of 5° to 15° in a cross-section along the extension direction of the slit in the rear wall surface and, the slit has a bent portion in the rear end portion which is provided so as to extend towards the rear end side while being bent towards the one jaw portion.

2. A tool body for a cutting tool with detachable insert comprising the head member according to claim 1, and a holder which has the head member attached to a tip portion thereof.

3. An cutting tool with detachable insert comprising the head member according to claim 1, a holder which has the head member attached to a tip portion thereof, and an insert clamped by the head member.

4. The head member for a cutting tool with detachable insert according to claim 1, wherein the bent portion is formed at a distance from an opening of a first insertion hole so as to have a circular-arc shape which is coaxial with the first insertion hole which is located in proximity with the rear end side of the slit.

* * * * *